United States Patent [19]
Heyl et al.

[11] Patent Number: 5,494,381
[45] Date of Patent: Feb. 27, 1996

[54] APPARATUS AND METHOD FOR PNEUMATICALLY CONVEYING BULK MATERIALS

[75] Inventors: Robert D. Heyl, Frisco, N.C.; John R. Havrilla, Danville, Pa.

[73] Assignee: The Young Industries, Inc., Muncy, Pa.

[21] Appl. No.: 44,878

[22] Filed: Apr. 6, 1993

Related U.S. Application Data

[63] Continuation of Ser. No. 683,734, Apr. 11, 1991, abandoned.

[51] Int. Cl.⁶ .................................................. B65G 53/66
[52] U.S. Cl. .......................... 406/14; 406/30; 406/144; 406/146
[58] Field of Search ........................ 406/11, 14, 24, 406/30, 31, 122, 144, 145, 146, 194

[56] References Cited

U.S. PATENT DOCUMENTS

| | | | |
|---|---|---|---|
| 1,755,329 | 4/1930 | McCormack | 406/144 X |
| 2,500,271 | 3/1950 | Bozich | 406/144 X |
| 3,365,242 | 1/1968 | Marchetti | 406/14 |
| 3,437,384 | 4/1969 | Bozich | 406/30 X |
| 4,662,799 | 5/1987 | Paul et al. | 406/14 |
| 4,863,316 | 9/1989 | Gianella et al. | 406/14 |
| 4,878,785 | 11/1989 | Heron et al. | 406/194 |
| 4,883,390 | 11/1989 | Reintjes et al. | 406/24 |

FOREIGN PATENT DOCUMENTS

| | | | |
|---|---|---|---|
| 174029 | 8/1986 | Japan | 406/14 |

*Primary Examiner*—Andrew C. Pike
*Attorney, Agent, or Firm*—Lalos & Keegan

[57] ABSTRACT

A bulk material conveying system includes a closed chamber having an inlet and an outlet and a conveyor communicating with the chamber outlet for receiving bulk material from the chamber. A pressurized gas is supplied to the upper portion of the chamber and to the conveyor to provide a pressure differential in the chamber which causes the bulk material in the chamber to flow through the outlet and conveyed through the conveyor. A pressure regulator is provided for automatically maintaining the pressure in the upper portion of the chamber at a predetermined value not to exceed a pressure sufficient to maintain the pressure differential during normal material flow rate conditions.

20 Claims, 2 Drawing Sheets

APPARATUS AND METHOD FOR PNEUMATICALLY CONVEYING BULK MATERIALS

This is a continuation of application Ser. No. 07/683,734 filed on Apr. 11, 1991, now abandoned.

BACKGROUND OF THE INVENTION

This invention relates to a bulk material conveying system and more particularly to such a system having improved material flow control means providing a shorter cycle time and an increased material throughput.

In the prior art, there has been developed a type of system for transporting batches of bulk material which generally consists of a pressure vessel in which the material to be transported is charged, a pneumatic conveying line communicating with a lower outlet port of the vessel for receiving material therefrom, and a gas supply system having a first branch line for supplying gas under pressure to the material conveying line for conveying material received from the vessel through the conveying line to a remote site, and a second branch line for supplying gas under pressure to an upper portion of the pressure vessel to pressurize the vessel and thus cause material to be force-fed from the vessel into the conveying line.

Typically, there is provided in such systems a shut-off valve, a manually operable flow control valve in the first branch line, and a manually operable flow control valve in the second line. In the operation of such a system, a batch of material is first loaded into the vessel. The shut-off valve is then opened to pressurize the branch lines and the flow control valve in the first line is opened and adjusted manually to provide a conveying pressure at the point of entry of the material from the vessel to the conveying line, in the range of 20 to 50 psi. The flow control valve in the second branch line is then opened and adjusted manually to provide a pressure in the upper portion of the vessel and further provide a pressure differential in the vessel in the range of 2 to 4 psi, ideally providing a flow rate of material in the conveying line of 20 to 25 ft/sec.

It has been found that such prior art systems have several disadvantages. By adjusting the valve in the second branch line to a restrictive setting sufficient to provide the desired operating pressure in the upper portion of the vessel, a prolonged time is required to pressurize the vessel thus correspondingly increasing the cycle time of the system and decreasing the material throughput. In addition, upon an overfeeding of material from the vessel into the conveying line and the possible occurrence of a partial or complete blockage of material in the conveying line, and a corresponding increase in pressure in the first branch line perhaps tending to remove such blockage, a corresponding increase in pressure develops in the upper portion of the vessel. The effect of such pressure increase in the upper portion of the vessel is to continue to feed material into the conveying line and thus compound the blockage problem. Upon removal of the blockage and a slow dissipation of the increased pressure in the conveying line, the increased pressure in the upper end of the vessel often has the effect of again overfeeding the conveying line and causing blockage to reoccur. It thus has been found to be desirable to provide a bulk material transport system of the type described having an improved flow control means which will have the effect of eliminating such disadvantages.

SUMMARY OF THE INVENTION

Accordingly, it is the principal object of the present invention to provide an improved bulk material transporting system.

Another object of the present invention is to provide a bulk material transporting system having improved material flow control means.

A further object of the present invention is to provide a system for transporting batches of bulk materials in which the cycle time of the system is decreased and the material throughput is increased.

A still further object of the present invention is to provide a system for transporting bulk material providing automatic material flow control which will improve system efficiency.

Another object of the present invention is to provide a system for transporting bulk material in which there is provided automatic control of the flow of material from a vessel into a transporting line.

A further object of the present invention is to provide an improved system for transporting bulk material which is simple in design, effective in performance, and efficient in operation.

Another object of the present invention is to provide an improved method of transporting bulk materials.

The foregoing and other objects of the invention are achieved with a bulk material conveying system including a closed chamber having an inlet and an outlet and a conveyor communicating with the chamber outlet for receiving bulk material from the chamber. A pressurized gas is supplied to the upper portion of the chamber and to the conveyor to provide a pressure differential in the chamber which causes the bulk material in the chamber to flow through the outlet and conveyed through the conveyor. A pressure regulator is provided for automatically maintaining the pressure in the upper portion of the chamber at a predetermined value not to exceed a pressure sufficient to maintain the pressure differential during normal material flow rate conditions.

Other objects and advantages of the present invention will become more apparent to those persons having ordinary skill in the art to which the present invention pertains from the following description taken in conjunction with the accompanying drawings.

DESCRIPTION OF THE PREFERRED EMBODIMENT

Figure 1:
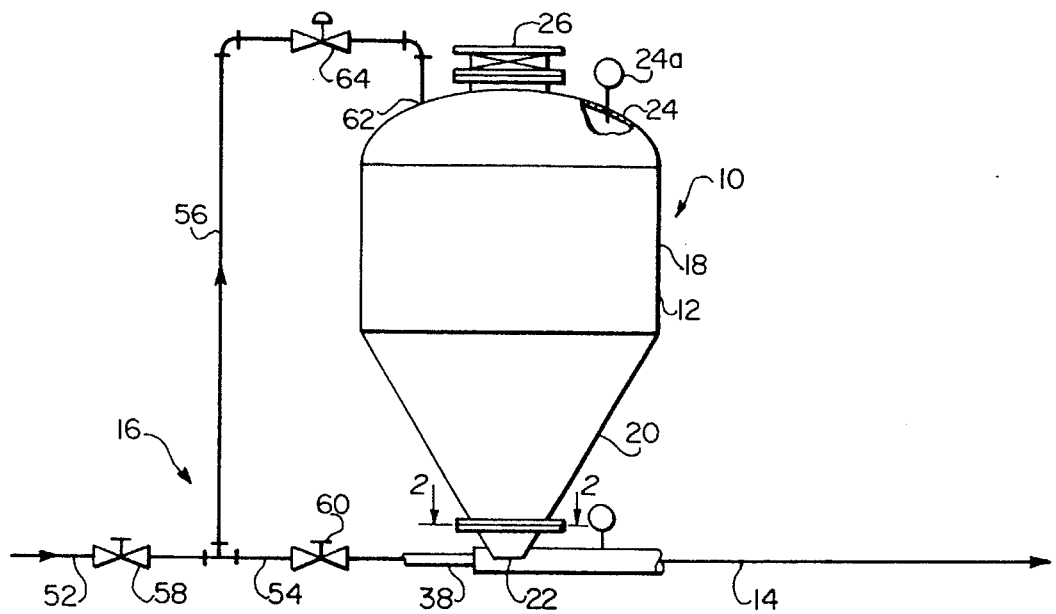
FIG. 1 is a schematic view of a bulk material transporting system embodying the present invention.

Referring to the drawings, there is illustrated a bulk material transporting system 10 generally including a pressure vessel 12, a pneumatic conveying line 14 for transporting material received from the vessel to a remote site, and a gas supply system 16. The vessel includes an intermediate section 18, a lower, inverted conical section 20 connected to a material receiving unit 22, and an upper section 24 provided with a material inlet 26. Batches of material charged into the pressure vessel through material inlet 26 are adapted to be force-fed through material receiving unit 22 to conveying line 14 to be pneumatically conveyed to a remote site in the conventional manner.

Figure 2:
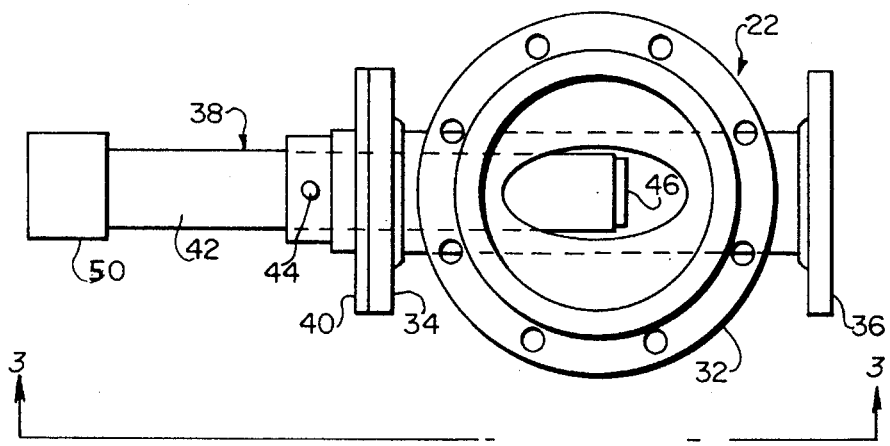
FIG. 2 is an enlarged, cross-sectional view taken along line 2—2 in FIG. 1.
Figure 3:
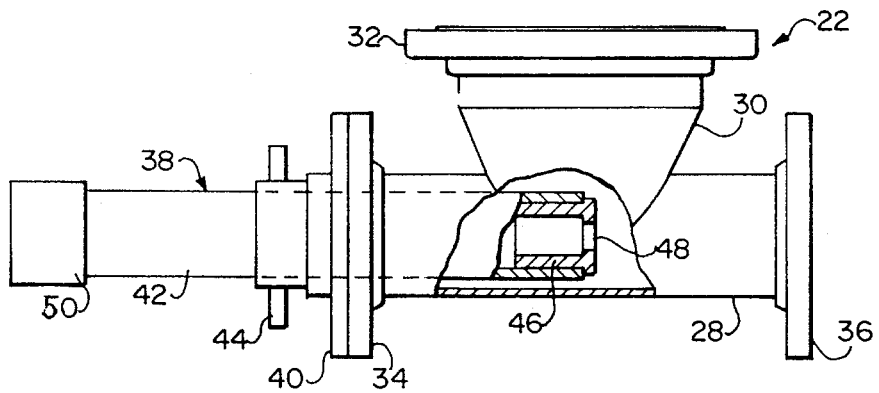
FIG. 3 is a view taken along line 3—3 of FIG. 2, having portions thereof broken away.

As best seen in FIGS. 2 and 3, material receiving unit 22 is secured to the lower end of the pressure vessel. The unit includes a pipe section 28 and a funnel section 30 which communicates with the interior of pipe section 28 for guiding material into the pipe section. The upper end of funnel section 30 is provided with an annular flange 32 which is adapted to be secured to a comparable mounting flange on the lower end of the conical section of the pressure vessel to allow material to flow from the pressure vessel to pipe section 28. The pipe section is provided with a pair of annular mounting flanges 34 and 36. A nozzle assembly 38 is mounted on flange 34 and mounting flange 36 is secured to a comparable flange of another pipe section forming a part of pneumatic conveying line 14.

Nozzle assembly 38 includes an internally threaded support flange 40 secured to mounting flange 34 by a set of bolt and nut fasteners, an externally threaded nozzle tube 42 threaded into the support flange and extending into pipe section 28 to a point below the funnel section of unit 22, and a locking ring 44 threaded onto nozzle tube 42 and adapted to bear against support flange 40 for locking the nozzle tube in a desired position. As best illustrated in FIG. 3, a nozzle 46 is threaded into a leading internally threaded end of the nozzle tube to provide an orifice 48. The trailing end of the nozzle tube is adapted to be connected to the gas supply system 16 through an adapter 50. It will be appreciated that by backing off the locking ring and rotating the nozzle tube, the position of the nozzle may be adjusted relative to the funnel section to alter the flow characteristics of the material being fed from the pressure vessel into the pneumatic conveying line. Once the positioning of the nozzle has been set, it may be fixed in place by running the locking nut up into engagement with the support flange. The flow characteristics of the unit further may be altered by the use of nozzles with orifices of different sizes.

Gas supply system 16 includes a main supply line 52 connected to a source of gas under pressure, a first branch line 54 and a second branch line 56. The main supply line includes a shut-off valve 58. Branch line 54 interconnects the main supply line and nozzle assembly 38 through adapter 50, and includes a manually operated flow control valve 60. Branch line 56 interconnects the main supply line and upper portion 24 of the pressure vessel through an inlet port 62, and is provided with a pressure regulating valve 64. Shut-off valve 58 is of a conventional type and functions to supply fluid under pressure from a source in the range of 80 to 100 psi to the two branch lines. Flow control valve 60 is manually operable to provide a pressure in the material receiving unit 22 at the point of entry of material therein in the range of 20 to 50 psi. Pressure regulating valve 64 is operable automatically initially to open fully to rapidly pressurize the upper portion of the pressure vessel to a pressure at 80 to 90% of a predetermined pressure in the order of 40 psi, sufficient to maintain a pressure differential in the pressure vessel in the range of 2 to 4 psi, and then to restrict the pressure in the pressure vessel to the predetermined pressure. In essence, valve 64 functions to rapidly pressurize the upper portion of the pressure vessel to the predetermined operating pressure, to create and maintain a pressure differential in the vessel, and then to isolate the upper end of the pressure vessel from the main gas supply line to prevent a pressure build-up in the upper portion of the pressure vessel.

In the operation of the system as described, with valve 58 closed, material inlet port 26 is opened to load a batch of material to be conveyed into the pressure vessel up to a level just below gas inlet port 62, as determined by a high level switch 24a, and the material inlet port is closed. Shut-off valve 58 is then opened to provide gas under pressure to branch lines 54 and 56. Gas flows through preset control valve 60 to pressurize conveying line 14. Sequentially, pressure regulating valve 64 will open fully to rapidly pressurize the upper portion of the pressure vessel. Pressure regulating valve 64 will remain widely open until the pressure in the upper portion of the vessel reaches 80 to 90% of the desired operating pressure. At such point, the desired pressure differential will be established in order to force feed material from the pressure vessel into the conveying line at a controlled flow rate to maximize throughput. Thereafter pressure regulating valve 64 will operate to maintain the pressure in the upper end of the pressure vessel at a value sufficient to maintain the desired pressure differential to provide the desired flow rate of material being fed into the conveying line. Steady state conditions thus will be established with the flow rate of material in the conveying line being in the range of 20 to 25 ft/sec, depending on the nature of the product being transported.

Whenever overfeeding occurs, there will be a build-up of pressure in branch line 54 caused by an excess of material or a blockage in the conveying line. As such pressure build-up occurs in branch line 54, pressure regulating valve 64 will function to isolate the upper portion of the pressure vessel from the main gas supply line and prevent a similar pressure build-up to occur in the upper portion of the pressure vessel which otherwise would have the effect of continuing to overfeed material into the conveying line compounding the blockage problem or causing blockage to reoccur.

Upon emptying the vessel, valve 58 is closed, the vessel is vented through conveying line 14 to reduce the pressure in the vessel and the system is then ready for the cycling of another batch of material.

Figure 4:
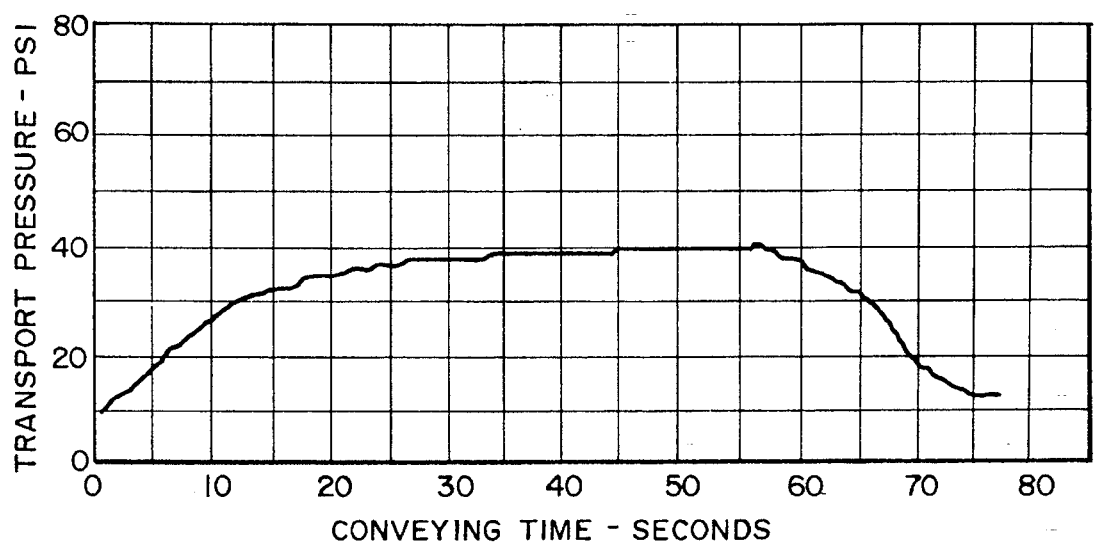
FIG. 4 is a graph illustrating the pressure in the upper end of a pressure vessel of the type described, as a function of time, representative of a comparable prior art transporting system.
Figure 5:
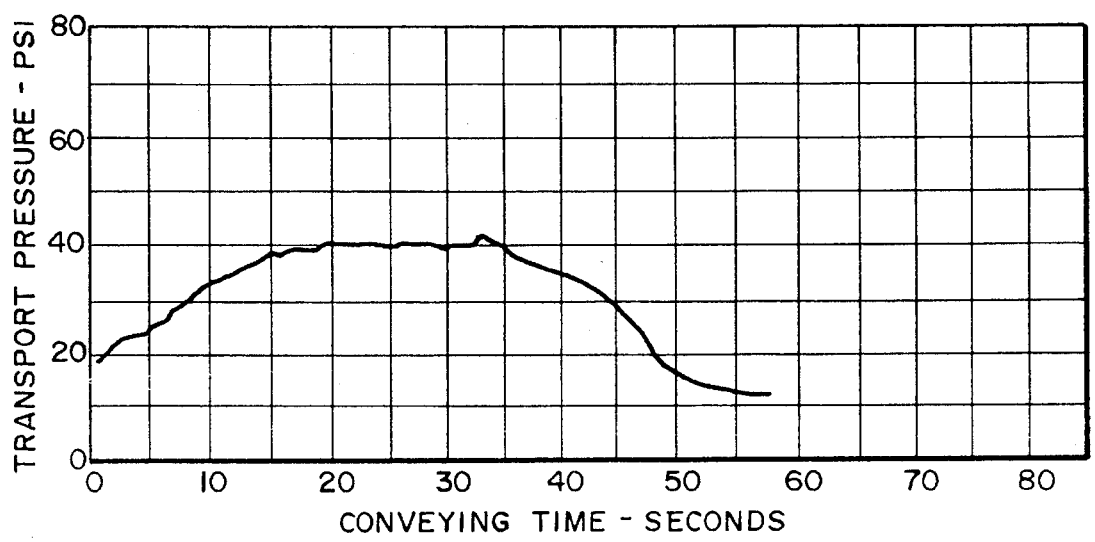
FIG. 5 is a graph illustrating the pressure in the upper end of a pressure vessel of the type described, as a function of time, representative of an embodiment of the present invention.

The use of a pressure regulating valve in the gas supply line for pressurizing the upper portion of the pressure vessel has three principal advantages over the use of a manually adjustable valve which is the common practice in the prior art. Firstly, the pressure regulating valve allows the pressure in the upper portion of the vessel to build up rapidly so as to reduce cycle time and correspondingly increase material throughput. This is best illustrated by the graph shown in FIGS. 4 and 5. FIG. 4 illustrates the pressure in the pressure vessel of a prior art system as a function of time. At an operating pressure of 40 psi, it is to be noted that approximately 45 seconds are required for the upper portion of the pressure vessel to reach operating pressure, and the cycle time is approximately 80 seconds. FIG. 5 illustrates the pressure in a comparable pressure vessel of the present invention, also as function of time. In contrast to the performance of the prior art system, it will be noted that at the same operating pressure, approximately 20 seconds are required to reach operating pressure in the proposed system and the cycle time is reduced to approximately 60 seconds, providing a throughput increase of 33⅓ percent.

Secondly, the pressure regulating valve functions to isolate the upper portion of the pressure vessel from the main gas supply line and thus prevent the pressure in the upper portion of the pressure vessel from exceeding a value sufficient to provide a pressure differential corresponding to flow conditions in the conveying line. This has the effect of preventing an increased pressure differential during an excess of material or a blockage condition in the conveying line which would further compound feeding material into the conveying line during blockage, or during a period following the removal of a blockage and a slow dissipation of pressure in the conveying line which could have the further effect of causing a reoccurrence of blockage in the conveying line. Essentially, by preventing a pressure buildup in the upper portion of the pressure vessel as is common in prior art systems, blockage removal in the conveying line is facilitated rather than compounded.

Thirdly, the use of the pressure regulator in line 56 provides automatic control of the flow of material from vessel 12 to conveying line 14. When conveying product, the rate of discharge of the material from the vessel into the conveying line will vary as the material characteristics change. A decrease in the flow rate of material in conveying line 14 will decrease the pressure in the conveying line but the pressure regulator will maintain the set pressure in the upper portion of the vessel. Under such circumstances, there will be an increase in the pressure differential that will increase the rate of flow material from the vessel into the conveying line. As product flow increases, the conveying line pressure increases to decrease the pressure differential and prevent overfeeding. Essentially, the pressure differential changes responsive to conveying line pressure.

Assuming the pressure in the upper portion of the vessel is $P_1$ and the conveying line pressure is $P_2$, there will be a pressure differential of $P_1-P_2$ or $\Delta P$. $P_1$ will remain constant due to the operation of pressure regulator 64. $P_2$ will vary depending on the rate of flow of material in the conveying line. If $\Delta P$ remains constant, the feed rate will remain constant to provide the desired feed rate under steady state conditions. If $P_2$ decreases due to a lower feed rate of material into the conveying line, $\Delta P$ will increase to correspondingly increase the feed rate. If $P_2$ increases due to a higher feed rate into the conveying line, $\Delta P$ will decrease to correspondingly decrease the feed rate of material flowing from the vessel to the conveying line. With $P_1$ remaining constant and $P_2$ varying, $\Delta P$ correspondingly will be caused to vary depending on variations in $P_2$ to provide the automatic control of the rate of flow of material from the vessel into the conveying line.

In the preferred embodiment of the system, a gas supply pressure of 80 to 100 psi is provided. The pressure of the conveying line at the point of entry of material being fed from the pressure vessel is in the range of 20 to 50 psi. This pressure varies according to the length of the conveying line and the quantity and flow characteristics of the material being transported. The amount of positive pressure applied to the top of the material in the vessel determines the rate at which material will flow out of the pressure vessel. Typically, a pressure differential of 2 to 4 psi is provided to provide a rate of flow of material in the conveying line in the range of 20 to 25 ft/sec.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A bulk material conveying system comprising:

means defining a closed chamber having a bulk material inlet and a bulk material outlet, said chamber including an upper portion;

bulk material conveying means communicating with said bulk material outlet of said chamber for receiving material therefrom and conveying said material downstream from said chamber, said upper portion being isolated from a portion of said conveying means downstream from said chamber except at said bulk material outlet;

means for supplying gas under pressure to said upper portion of said chamber to pressurize said upper portion at an upper chamber pressure and to said conveying means to pressurize said conveying means at a conveying means pressure so as to provide a pressure differential in said chamber between said upper chamber pressure and a pressure at said bulk material outlet causing said material therein to flow through said bulk material outlet and be conveyed through said conveying means at a predetermined flow rate; and means disposed in and communicating with said supplying means for automatically maintaining said upper chamber pressure at a predetermined pressure regardless of said bulk material outlet pressure while said pressure differential varies solely in response to flow conditions of said material in said conveying means whereby upon a decrease in a flow rate of said material in said conveying means below said predetermined flow rate and a corresponding decrease in said bulk material outlet pressure, said pressure differential shall automatically increase to correspondingly increase the flow rate of said material fed into said conveying means, and upon an overfeeding condition resulting in an increase in the flow rate of said material in said conveying means above said predetermined flow rate and a correspondingly increase in said bulk material outlet pressure, said pressure differential shall automatically decrease to correspondingly decrease the flow rate of said material being fed into said conveying means.

2. A system according to claim 1 wherein said predetermined flow rate of said material in said conveying means is in a range of 20 to 25 ft/sec.

3. A system according to claim 1, wherein said gas under pressure is at a pressure in a range of 80 to 100 psi.

4. A system according to claim 1 wherein said pressure differential is in a range of 2 to 4 psi.

5. A system according to claim 1 wherein said conveying means communicates with said bulk material outlet of said chamber at a point of entry, and the gas pressure at said point of entry is in a range of 20 to 50 psi.

6. A system according to claim 1 wherein said pressure maintaining means is operable to cause said gas to freely flow into said chamber until 80 to 90% of a pressure sufficient to maintain said pressure differential is reached, whereupon said pressure maintaining means functions to allow said gas to flow into said chamber at a restricted rate until said predetermined pressure is reached.

7. A system according to claim 1 wherein said pressure maintaining means comprises a pressure regulator.

8. A system according to claim 1 further including means for manually adjusting said conveying means pressure.

9. A system according to claim 1 wherein said gas supplying means for supplying said gas to said conveying means includes a nozzle.

10. A system according to claim 1 wherein said pressure maintaining means is operable to rapidly pressurize said chamber to said predetermined pressure and thereafter maintain said predetermined pressure during each operating cycle of said system.

11. A system according to claim 1 wherein said pressure maintaining means is operable to communicate the upper portion of said chamber with said gas supplying means until said chamber is pressurized to said predetermined pressure and then to isolate the upper portion of said chamber from said gas supplying means to prevent an increase in pressure in said chamber above said predetermined pressure.

12. A system according to claim 1 wherein said pressure maintaining means is operable for sequentially rapidly pressurizing said chamber to a pressure in the range of 80 to 90% of said predetermined pressure, continuing to pressurize said chamber at a reduced rate to said predetermined pressure, and then maintaining said predetermined pressure.

13. A method of conveying bulk material in a material transport system including means defining a closed chamber and means for pneumatically conveying said material communicating with said chamber for receiving said material therefrom, comprising:

introducing a batch of said material to be conveyed into said chamber;

supplying gas under pressure to said conveying means at a first pressure sufficient to cause a flow of said material received from said chamber along said conveying means to a remote location;

supplying a supply of gas under pressure to an upper portion of said chamber to pressurize said chamber to a second pressure above said first pressure to provide a pressure differential causing said material in said chamber to be force-fed into said conveying means; and restricting the supply of gas under pressure to the upper portion of said chamber via a restricting means disposed in and communicating with the supply of gas under pressure to prevent a pressure in the upper portion of said chamber from exceeding said second pressure while permitting said pressure differential to vary solely in response to the flow conditions in the conveying means.

14. A method according to claim 13, wherein said gas under pressure is at a pressure in a range of 80 to 100 psi.

15. A method according to claim 13 wherein said first pressure is in a range of 20 to 50 psi.

16. A method according to claim 13 wherein said pressure differential is in a range of 2 to 4 psi.

17. A method according to claim 13 wherein said second pressure is in a range of 20 to 50 psi.

18. A method according to claim 13 further including initially rapidly pressurizing said chamber to said second pressure and thereafter maintaining said second pressure, during each operating cycle of the system.

19. A method according to claim 13 further including:

communicating the upper portion of said chamber with a source of system operating pressure until said chamber is pressurized to said second pressure while communicating said conveying means with said source of said system operation pressure to pressurize said conveying means to said first pressure to provide said pressure differential, and isolating the upper portion of said chamber from said source of said system operating pressure upon the upper portion becoming pressurized to said second pressure whereby any change in pressure in said conveying means will not alter the pressure in the upper portion of said chamber.

20. A method according to claim 13 further including sequentially:

rapidly pressurizing said chamber to a pressure in a range of 80% to 90% of said second pressure;

continuing to pressurize said chamber at a reduced rate to said second pressure; and maintaining said second pressure in said chamber for a remainder of a conveying cycle.

* * * * *